US006957290B1

(12) United States Patent
Rowlands et al.

(10) Patent No.: US 6,957,290 B1
(45) Date of Patent: Oct. 18, 2005

(54) FAST ARBITRATION SCHEME FOR A BUS

(75) Inventors: Joseph B. Rowlands, Santa Clara, CA (US); David L. Anderson, Santa Clara, CA (US); Shailendra S. Desai, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 454 days.

(21) Appl. No.: 09/684,023

(22) Filed: Oct. 6, 2000

(51) Int. Cl.[7] .............................................. G06F 13/14
(52) U.S. Cl. ...................... 710/240; 710/241; 710/244
(58) Field of Search ............................... 710/240–244; 711/29, 113, 100

(56) References Cited

U.S. PATENT DOCUMENTS

| | | | |
|---|---|---|---|
| 4,257,095 A | 3/1981 | Nadir | |
| 5,045,997 A | 9/1991 | Watanabe | |
| 5,151,994 A | 9/1992 | Wille et al. | |
| 5,168,568 A | 12/1992 | Thayer et al. | |
| 5,265,223 A | 11/1993 | Brockmann et al. | |
| 5,301,282 A | 4/1994 | Amini et al. | |
| 5,509,125 A | 4/1996 | Johnson et al. | |
| 5,594,876 A | 1/1997 | Getzlaff et al. | |
| 5,710,891 A | 1/1998 | Normoyle et al. | |
| 5,987,549 A | 11/1999 | Hagersten et al. | |
| 6,021,451 A | 2/2000 | Bell et al. | |
| 6,038,624 A | 3/2000 | Chan et al. | |
| 6,076,132 A | 6/2000 | Chen | |
| 6,092,137 A | 7/2000 | Huang et al. | |
| 6,173,349 B1 | 1/2001 | Qureshi et al. | |
| 6,199,133 B1 * | 3/2001 | Schnell | 710/110 |
| 6,321,309 B1 | 11/2001 | Bell et al. | |
| 6,467,002 B1 * | 10/2002 | Yang | 710/116 |
| 6,571,306 B1 * | 5/2003 | Smith | 710/240 |

FOREIGN PATENT DOCUMENTS

| | | |
|---|---|---|
| EP | 0497054 A2 | 8/1992 |
| EP | 01308531.1 | 5/2003 |
| EP | 01308533.7 | 5/2003 |
| WO | WO 00/34876 A | 6/2000 |

OTHER PUBLICATIONS

PowerPC™ 601, RISC Microprocessor User's Manual, 6 pgs., © Motorola, Inc. 1993.
Halfhill, "SiByte Reveals 64-Bit Core for NPUs," Microprocessor Report, Jun. 2000, pp. 45–48.
Pentium® Pro Family Developer's Manual, vol. 1: Specifications, Chapter 4, pp. 1–18, 1996.

* cited by examiner

Primary Examiner—Tim Vo
Assistant Examiner—Kim T. Huynh
(74) Attorney, Agent, or Firm—Garlick Harrison & Markison LLP

(57) ABSTRACT

A distributed arbitration scheme includes arbiters with each agent. The arbiters receive request signals indicating which agents are arbitrating for the bus. Additionally, the agent currently using the bus broadcasts an agent identifier assigned to that agent. The arbiters receive the agent identifier and use the agent identifier as an indication of the winner of the preceding arbitration. Accordingly, the arbiters determine if the corresponding agent wins the arbitration, but may not attempt to calculate which other agent wins the arbitration. In one embodiment, the arbiter maintains a priority state indicative of which of the other agents are higher priority than the corresponding agent and which of the other agents are lower priority. In one implementation, the bus may be a split transaction bus and thus each requesting agent may include an address arbiter and each responding agent may include a data arbiter.

42 Claims, 9 Drawing Sheets

FAST ARBITRATION SCHEME FOR A BUS

BACKGROUND OF THE INVENTION

1. Field of the Invention

This invention is related to the field of digital systems and, more particularly, to arbitration schemes for a bus.

2. Description of the Related Art

A bus is frequently used in digital systems to interconnect a variety of devices included in the digital system. Generally, one or more devices are connected to the bus, and use the bus to communicate with other devices connected to the bus. As used herein, the term "agent" is used to refer to a device which is capable of communicating on the bus. The agent may be a requesting agent if the agent is capable of initiating transactions on the bus and may be a responding agent if the agent is capable of responding to a transaction initiated by a requesting agent. A given agent may be capable of being both a requesting agent and a responding agent. Additionally, a "transaction" is a communication on the bus. The transaction may include an address transfer and optionally a data transfer. Transactions may be read transactions (transfers of data from the responding agent to the requesting agent) and write transactions (transfers of data from the requesting agent to the responding agent). Transactions may further include various coherency commands which may or may not involve a transfer of data.

The bus is a shared resource among the agents, and thus a mechanism for determining which agent is permitted to use the bus at any given time is needed. Generally, determining which of several agents is permitted to use the bus is referred to as "arbitration". Using the bus is often referred to as mastering the bus. An agent desiring to use the bus may signal its request to use the bus, referred to as "arbitrating". The circuitry for performing arbitration is referred to as an "arbiter". One or more agents may arbitrate for the bus, and the arbiter determines which of the arbitrating agents is permitted to use the bus. The agent granted use of the bus by the arbiter is referred to as the winner of the arbitration.

Typically, the arbitration scheme is required to provide some level of fairness. Generally, an arbitration scheme is referred to as "fair" if, in the presence of continuous requests from all agents, each agent is eventually granted use of the bus. In a completely fair scheme, each arbitrating agent is granted use of the bus before a previously granted agent is given a second grant. For example, a round-robin scheme is often used in which the highest priority in the arbitration scheme (and thus the winner even if all agents are arbitrating) is rotated to each agent in turn, thus guaranteeing at least one granting of the bus to each agent during the rotation. Other schemes for ensuring fairness are possible as well, including schemes which are not completely fair but still ensure an eventual grant to each requesting agent.

Arbitration may be centralized or distributed. In centralized arbitration, all arbitration requests are sent to a central arbiter which provides a grant to one of the agents. In distributed arbitration, each agent includes an arbiter which receives arbitration requests and determines the winner of the arbitration. If the agent corresponding to the arbiter is the winner, the arbiter informs the agent that it has won and that agent uses the bus. Distributed arbitration may reduce the time required from request to grant as compared to centralized arbitration, since the grant may be transmitted to the winning agent locally from the distributed arbiter at the winning agent.

Unfortunately, distributed arbitration schemes may be complex to implement, since each arbiter must generally track the exact position in the arbitration scheme of each of the agents to maintain fairness. Each arbiter calculates the winner of the arbitration, and updates the position in the scheme of all the agents to prepare for the next arbitration. This complex calculation of the winner of the arbitration may require a significant period of time to perform, thus potentially limiting the speed at which arbitration may be completed and thus the bandwidth and/or latency characteristics of the bus. A method for speeding the operation of a distributed arbitration scheme is therefore desired.

SUMMARY OF THE INVENTION

The problems outlined above are in large part solved by an arbitration apparatus as described herein. A distributed arbitration scheme is used, with arbiters included with each agent. The arbiters receive request signals indicating which agents are arbitrating for the bus. Additionally, the agent currently using the bus broadcasts an agent identifier assigned to that agent. The arbiters receive the agent identifier and use the agent identifier as an indication of the winner of the preceding arbitration. Accordingly, the arbiters determine if the corresponding agent wins the arbitration, but may not attempt to calculate which agent actually wins the arbitration if the corresponding agent does not win. Instead, the winner is indicated via the agent identifier in the transaction. Determining whether or not the corresponding agent wins the arbitration may be performed rapidly, while calculating the exact winner if the corresponding agent is not the winner may be more complex and may require more time to complete. Since the computation may be eliminated in favor of receiving the agent identifier, the arbiter may be capable of high frequency operation.

Accordingly, in one embodiment, the arbiter maintains a priority state indicative of which of the other agents are higher priority than the corresponding agent for arbitration and indicative of which of the other agents are lower priority than the corresponding agent for arbitration. Since only the relative priority of the other agents to the corresponding agent is stored, the state may be smaller than the state which represents the exact priority between all of the agents. Furthermore, the determination of whether or not the corresponding agent wins the grant may be fairly rapid. Particularly, the corresponding agent may win the arbitration if no other agent which is currently higher priority than the corresponding agent is arbitrating. The updating of the state may be relatively quick as well. The winning agent is provided via the agent identifier, and (if not the corresponding agent) is indicated in the updated state as lower priority than the corresponding agent. If the winning agent is the corresponding agent, all of the other agents are indicated in the updated state as higher priority than the corresponding agent. Since the winning agent is made lowest priority for subsequent arbitrations, a high degree of fairness may be achieved as well, in various embodiments.

In one implementation, the bus may be a split transaction bus and thus each requesting agent may include an address arbiter and each responding agent may include a data arbiter. The arbiters may function independently, and each arbiter may function as described above. For address arbitration, the agent identifier may be part of a transaction identifier for the transaction. For data arbitration, the agent identifier may be separate from the transaction identifier (which may be used to match the data phase with the corresponding address phase of the transaction).

Broadly speaking, a first agent is contemplated. The first agent is configured for coupling to a bus to which a plurality of agents are capable of being coupled. The first agent includes an arbiter coupled to receive a plurality of request signals. Each of the plurality of request signals corresponds to a respective agent of the plurality of agents, and is indicative of whether or not the respective agent is arbitrating for the bus. The arbiter is also coupled to receive an agent identifier transmitted on the bus as part of a transaction. The agent identifier identifies a second agent using the bus. The arbiter is configured to determine if the first agent wins an arbitration for the bus responsive to the plurality of request signals and the agent identifier.

Additionally, a system is contemplated comprising a bus and a plurality of agents coupled to the bus. The bus includes a plurality of request signals and an agent identifier transmitted with a transaction on the bus. Each agent of the plurality of agents is coupled to a respective one of the plurality of request signals for providing an indication of whether or not the agent is arbitrating for the bus. A first agent using the bus is configured to provide the agent identifier indicative of the first agent. Each respective agent of the plurality of agents includes an arbiter coupled to receive each of the plurality of request signals corresponding to other ones of the plurality of agents and to receive the agent identifier. The arbiter is configured to determine if the respective agent wins an arbitration for the bus responsive to the plurality of request signals and the agent identifier.

Moreover, a method is contemplated. A state indicative of: (i) which of a plurality of agents coupled to a bus are higher priority than a first agent for an arbitration, and (ii) which of the plurality of agents are lower priority than the first agent for the arbitration is maintained. An agent identifier is received. The agent identifier is indicative of a second agent using the bus, and is transmitted on the bus as part of a transaction. The state is updated responsive to the agent identifier.

Still further, an arbiter is contemplated, comprising one or more registers and a circuit. The registers are configured to store a state indicative of: (i) which of a plurality of agents coupled to a bus are higher priority than a first agent for an arbitration, and (ii) which of the plurality of agents are lower priority than the first agent for the arbitration. Coupled to receive an agent identifier indicative of a second agent using the bus, the first circuit is configured to update the state responsive to the agent identifier. The agent identifier is transmitted on the bus as part of a transaction.

BRIEF DESCRIPTION OF THE DRAWINGS

Other objects and advantages of the invention will become apparent upon reading the following detailed description and upon reference to the accompanying drawings in which.

Figure 1:
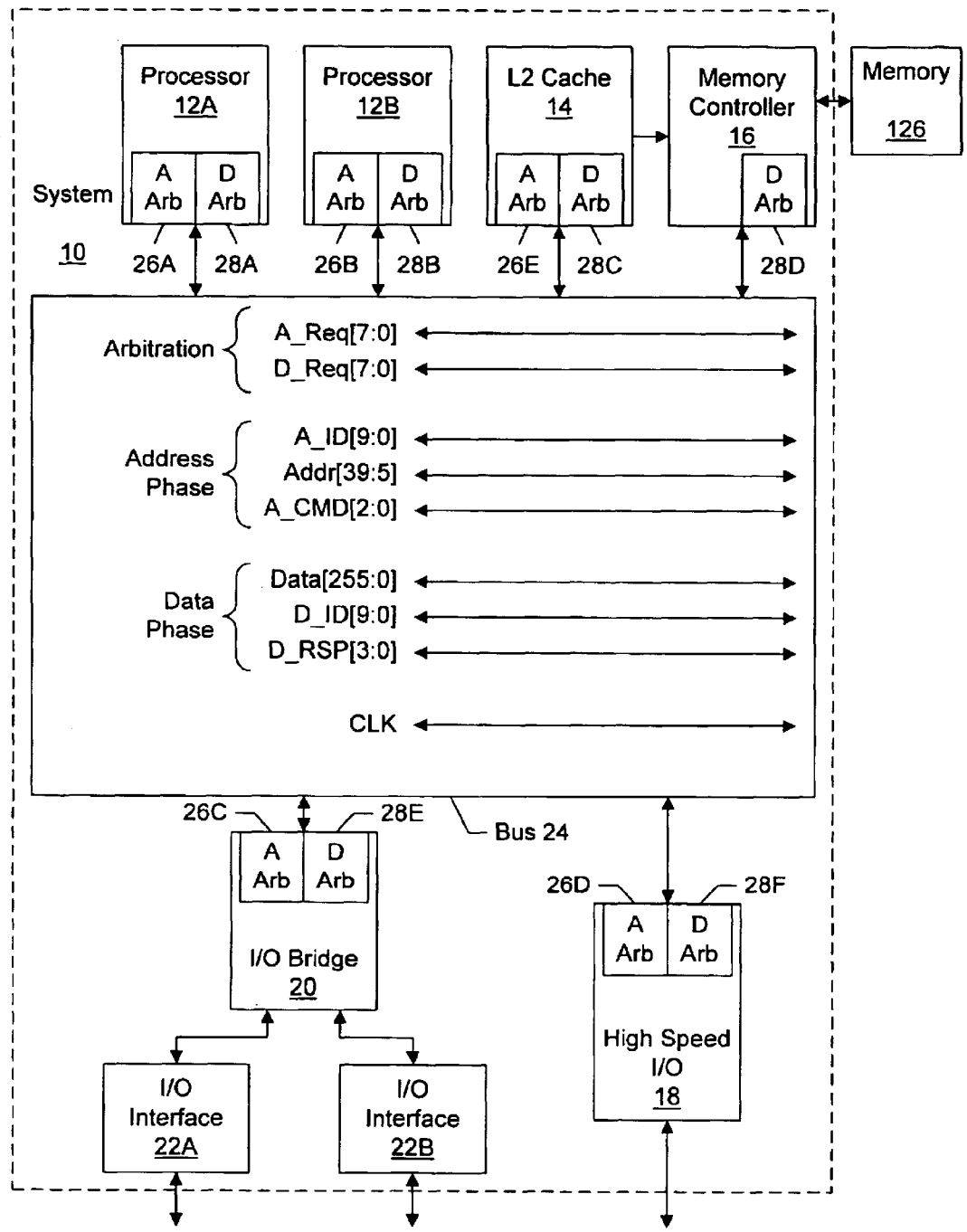
FIG. 1 is a block diagram of one embodiment of a system including a plurality of agents, each agent including arbiters.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a high speed input/output (I/O) bridge 18, an I/O bridge 20, and I/O interfaces 22A–22B. System 10 may include a bus 24 for interconnecting the various components of system 10. As illustrated in FIG. 1, each of processors 12A–12B, L2 cache 14, memory controller 16, high speed I/O bridge 18 and O bridge 20 are coupled to bus 24. Each of processors 12A–12B, L2 cache 14, high speed I/O bridge 18, and I/O bridge 20 include an address bus arbiter (A Arb) labeled with reference numerals 26A–26E as illustrated in FIG. 1. Each of processors 12A–12B, L2 cache 14, memory controller 16, high speed I/O bridge 18, and I/O bridge 20 include a data bus arbiter (D Arb) labeled with reference numerals 28A–28F as illustrated in FIG. 1. I/O bridge 20 is coupled to I/O interfaces 22A–22B. L2 cache 14 is coupled to memory controller 16, which is further coupled to a memory 126.

Bus 24 may be a split transaction bus in the illustrated embodiment. A split transaction bus splits the address and data portions of each transaction and allows the address portion (referred to as the address phase) and the data portion (referred to as the data phase) to proceed independently. In the illustrated embodiment, the address bus and data bus are independently arbitrated for, allowing for out of order data phases with respect to the corresponding address phases. Each transaction including both address and, data thus includes an arbitration for the address bus, an address phase, an arbitration for the data bus, and a data phase. Additionally, coherent transactions may include a response phase for communicating coherency information after the address phase.

Various signals included in bus 24 are illustrated in FIG. 1, including arbitration signals, address phase signals, and data phase signals. The arbitration signals include a set of address request signals (A_Req[7:0]) used by each requesting agent to arbitrate for the address bus and a set of data request signals (D_Req[7:0]) used by each responding agent to arbitrate for the data bus. The address phase signals include an address bus used to provide the address of the transaction (Addr[39:5]), a command (A_CMD[2:0]) used to indicate the transaction to be performed (read, write, etc.), and a transaction ID (A_ID[9:0]) used to identify the transaction. More particularly, the transaction ID may be used for read and write transactions to match the address phase with the subsequent data phase of the transaction. A portion of the transaction ID is an agent identifier identifying the requesting agent. For example, the agent identifier may be bits 9:6 of the transaction ID. Each agent is assigned a different agent identifier. The data phase signals include a data bus (Data[255:0]), a transaction ID (D_ID[9:0]) similar to the transaction ID of the address phase and used to match the address phase with the corresponding data phase, and a responder ID (D_RSP[3:0]). The responder ID is the agent identifier of the responding agent who arbitrated for the data bus to perform the data transfer. Additionally, bus 24 includes a clock signal (CLK) which carries a clock to which the bus signals are referenced. Both the address phase and the data phase may include other signals, as desired, such as the cacheability and coherency attributes of a transaction in the address phase and data error signals in the data phase.

System 10 employs a distributed arbitration scheme, and thus each requesting agent includes an address arbiter 26A–26E and each responding agent includes a data arbiter 28A–28F. Each requesting agent is assigned an address request signal (one of A_Req[7:0]), and each responding agent is assigned a data request signal (D_Req[7:0]). More particularly, as mentioned above, each agent is assigned an agent identifier and the corresponding address request signal and/or data request signal may be used by that agent. For example, the agent identifier may be hardwired in each agent, or may be wired via input signals strapped to power or ground to form the agent identifier. In one exemplary implementation, processor 12A may be assigned agent identifier 0 (and thus may use A_Req[0] and D_Req[0]), processor 12B may be assigned agent identifier 1, high speed I/O bridge 18 may be assigned agent identifier 2, I/O bridge 20 may be assigned agent identifier 3, a system control and debug block (not shown) may be assigned agent identifier 4, L2 cache 14 may be assigned agent identifier 6, and memory controller 16 may be assigned agent identifier 7. In another alternative, agent identifiers may be programmable in each agent using configuration commands.

The fairness scheme implemented by one embodiment of system 10 may be one in which the agent granted the bus is made lowest priority for being granted the bus again. The highest priority agent which is requesting the bus is granted the bus. Since address and data buses are separately arbitrated, separate priority states are maintained for the address and data buses.

Each address arbiter 26A–26E is coupled to receive at least the address request signals (A_Req[7:0]) corresponding to each other requesting agent besides the requesting agent to which that address arbiter corresponds (the "corresponding agent"). For example, the corresponding agent of address arbiter 26A is processor 12A and address arbiter 26A receives the address request signals from each other agent (including the address request signals from processor 12B, I/O bridge 20, and high speed I/O bridge 18). The address arbiter tracks which of the agents are higher priority than the corresponding agent and which agents are lower priority than the corresponding agent for address bus arbitration. Thus, given the request signals from each other agent, the address arbiter can determine whether or not the corresponding agent wins the arbitration for the address bus. This determination may be relatively quick, and thus arbitration may be performed rapidly. Rather than attempt to calculate which other agent did win the arbitration, the address arbiter uses the agent identifier (A_ID[9:6]) in the address phase of the transaction performed by the arbitration winner to update the priority state for the corresponding agent. More particularly, the agent which won the arbitration is marked as lower priority than the corresponding agent. On the other hand, if the corresponding agent does win the arbitration, the address arbiter updates the priority state to indicate that each other agent is higher priority than the corresponding agent.

Each data arbiter 28A–28F is similarly coupled to receive at least the data request signals (D_Req[7:0]) corresponding to each other responding agent besides the responding agent to which that data arbiter corresponds. The data arbiter tracks which of the agents are higher priority than the corresponding agent and which agents are lower priority than the corresponding agent for data bus arbitration. Thus, given the request signals from each other agent, the data arbiter can determine whether or not the corresponding agent wins the arbitration for the data bus. This determination may be relatively quick, and thus arbitration may be performed rapidly. Rather than attempt to calculate which other agent did win the arbitration, the data arbiter uses the agent identifier (D_RSP[3:0]) in the data phase of the transaction performed by the arbitration winner to update the priority state for the corresponding agent. More particularly, the agent which won the arbitration is marked as lower priority than the corresponding agent. On the other hand, if the corresponding agent does win the arbitration, the data arbiter updates the priority state to indicate that each other agent is higher priority than the corresponding agent.

The data phase includes D_RSP[3:0] to provide the agent identifier because the transaction ED (D_ID[9:0]) is used to match the address phase and data phase of a transaction. Thus, the portion of the transaction ID identifying the initiating agent may not identify the data bus arbitration winner. Generally, the data bus is arbitrated for by the agent providing the data for a transaction. Thus, for read transactions, the responding agent arbitrates for the data bus. The requesting agent is identified in the transaction ID, but D_RSP[3:0] identifies the responding agent. For write transactions, the requesting agent arbitrates for the data bus. The requesting agent may arbitrate for the data bus in these cases and thus D_RSP[3:0] and D_ID[9:6] may carry the same value.

In the above fashion, rapid arbitration may be performed and the complex calculation of the exact arbitration winner may be eliminated from the arbiter. Instead, each arbiter determines only whether or not the corresponding agent is the arbitration winner. The agent identifier included in the transaction is used to update the priority state. Furthermore, since the priority state may be only the relative priority of other agents to the corresponding agent (i.e. whether the other agents are higher or lower priority than the corresponding agent), the priority state may be small as compared to the state needed to exactly track the priority level of each agent.

Bus 24 may be pipelined. More particularly, the arbitration for the address bus may be pipelined with the address transfer itself. In other words, an address transfer may be occurring during a first clock cycle and arbitration for the address transfer to be performed in the next clock cycle may be performed during the first clock cycle. Similarly, a data transfer may be occurring during the first clock cycle and arbitration for the data transfer to be performed in the next clock cycle may be performed during the first clock cycle. Address transfers on bus 24 may be performed in a single cycle, as may data transfers (e.g. the data bus is a cache line wide in the illustrated embodiment). Other embodiments may use more than one clock cycle for the address transfer and/or the data transfer.

Bus 24 may employ any suitable signalling technique. For example, in one embodiment, bus 24 may employ differential signalling for high speed transmission. For example, each signal within bus 24 may be a differential pair of signals. Other embodiments may employ any other signalling technique (e.g. TTL, CMOS, GTL, HSTL, etc.).

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be a lower level cache than L2. L2 cache 14 may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 126 in response to memory transactions received on bus 24. Memory controller 16 receives a hit signal from L2 cache 14, and if a hit is detected in L2 cache 14 for a memory transaction, memory controller 16 does not respond to that memory transaction. If a miss is detected by L2 cache 14, or the memory transaction is non-cacheable, memory controller 16 may access memory 126 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

High speed I/O bridge 18 may be an interface to a high speed I/O interconnect. For example, high speed I/O bridge 18 may implement the Lightning Data Transport (LDT) I/O fabric developed by Advanced Micro Devices, Inc. Other high speed interfaces may be alternatively used.

I/O bridge 20 is used to link one or more I/O interfaces (e.g. I/O interfaces 22A–22B) to bus 24. 110 bridge 20 may serve to reduce the electrical loading on bus 24 if more than one I/O interface 22A–22B is bridged by I/O bridge 20. Generally, I/O bridge 20 performs transactions on bus 24 on behalf of 110 interfaces 22A–22B and relays transactions targeted at an I/O interface 22A–22B from bus 24 to that I/O interface 22A–22B. I/O interfaces 22A–22B may be lower bandwidth, higher latency interfaces. For example, I/O interfaces 22A–22B may include one or more serial interfaces, Personal Computer Memory Card International Association (PCMCIA) interfaces, Ethernet interfaces (e.g. media access control level interfaces), Peripheral Component Interconnect (PCI) interfaces, etc.

It is noted that system 10 (and more particularly processors 12A–12B, L2 cache 14, memory controller 16, 110 interfaces 22A–22B, I/O bridge 20, I/O bridge 18 and bus 24 may be integrated onto, a single integrated circuit as a system on a chip configuration. In another configuration, memory 126 may be integrated as well. Alternatively, one or more of the components may be implemented as separate integrated circuits, or all components may be separate integrated circuits, as desired. Any level of integration may be used.

As used herein, a transaction "targets" a location or device if the location or device is the provider of data for the transaction (for a read transaction) or receiver of data for the transaction (for a write transaction). Viewed in another way, a transaction may target a location or device if the address of the transaction is mapped to that location or device.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated.

It is noted that, while various bit ranges for signals are illustrated in FIG. 1 and other figures below, the bit ranges may be varied in other embodiments. The number of request signals, the size of the agent identifier and transaction ID, the size of the address bus, the size of the data bus, etc., may all be varied according to design choice.

Figure 2:
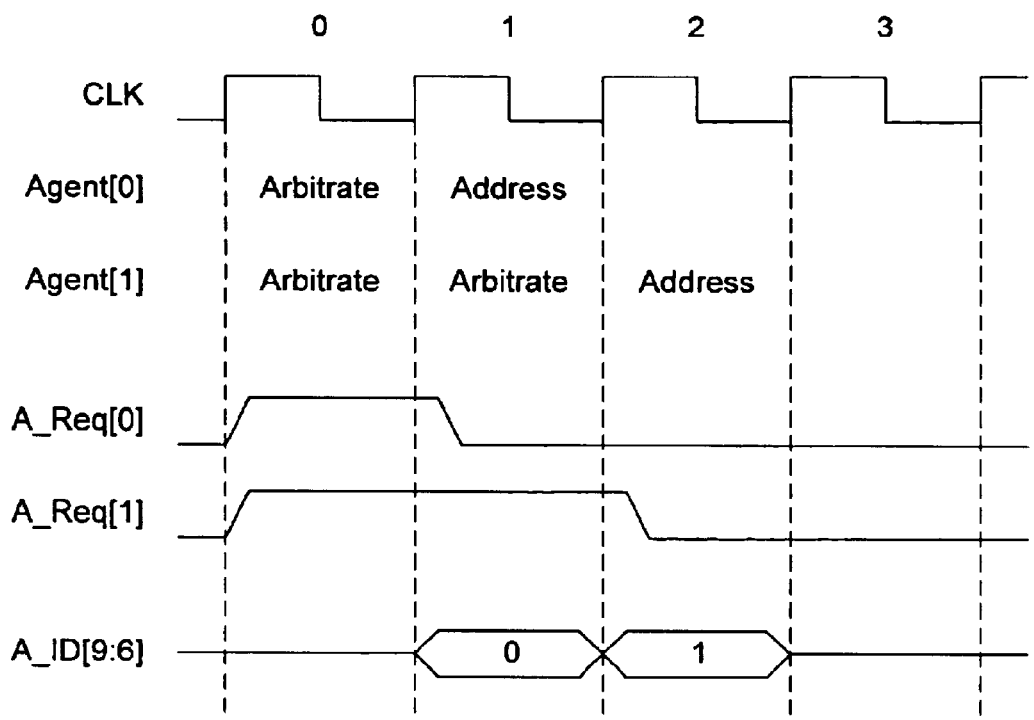
FIG. 2 is a timing diagram illustrating aspects of one embodiment of address bus arbitration.

Turning now to FIG. 2, a timing diagram is shown illustrating address arbitration according to one embodiment of system 10. Other embodiments are possible and contemplated. As shown in FIG. 2, four clock cycles of the bus 24 are illustrated (labeled 0 through 3 above the clock cycles). Clock cycles are delimited by vertical dashed lines.

FIG. 2 illustrates two agents (the agent assigned agent identifier 0 and the agent assigned agent identifier 1, more succinctly referred to as agent[0] and agent[1]) arbitrating for the address bus. During clock cycle 0, both address request signals are asserted (A_Req[0] and A_[1]). Thus, the address arbiters corresponding to agent[0]and agent [1] determine whether or not the corresponding agent gets the grant. In the illustration, agent[0] is currently higher priority than agent[1], and thus the address arbiter corresponding to agent[0] indicates to agent[0] that it has won the arbitration. During clock cycle 1, agent[0] drives the address bus and thus A_ID[9:6] in clock cycle 1 indicates agent identifier 0. During clock cycle 1, agent[ 1] continues to arbitrate for the address bus and agent[0] deasserts its address request signal (although agent[0] could still have arbitrated in clock cycle 1 if agent[0] had an additional transaction to perform). Thus, in clock cycle 1, the address arbiter corresponding to agent [1] indicates to agent[1] that it has won the arbitration. During clock cycle 2, agent[1] drives the address bus and thus A_ID[9:6] in clock cycle 2 indicates agent identifier 1.

FIG. 2 illustrates the pipelining of arbitration and address transfer implemented by one embodiment of system 10. Accordingly, a new transaction may be initiated via an address transfer at a maximum rate of one per clock cycle, providing high bandwidth address transfers. Other embodiments may use more than one clock cycle per address transfer.

The clock signal for bus 24 (CLK) is illustrated in FIG. 2 as well. For the illustrated embodiment, the clock cycle boundaries correspond to the rising edge of the clock signal. Alternatively, the falling edge of the clock signal could delimit the clock cycle boundary.

Signals are driven on bus 24 referenced to the rising edge of the clock signal, and are sampled by receiving devices referenced to the falling edge of the clock signal. Thus, the address arbiters sample the address request signals and the agent identifier for the current address transfer on the falling edge of the clock signal, and compute whether or not the corresponding agent is granted the address bus. The winning agent drives the address bus in the subsequent clock cycle.

Figure 3:
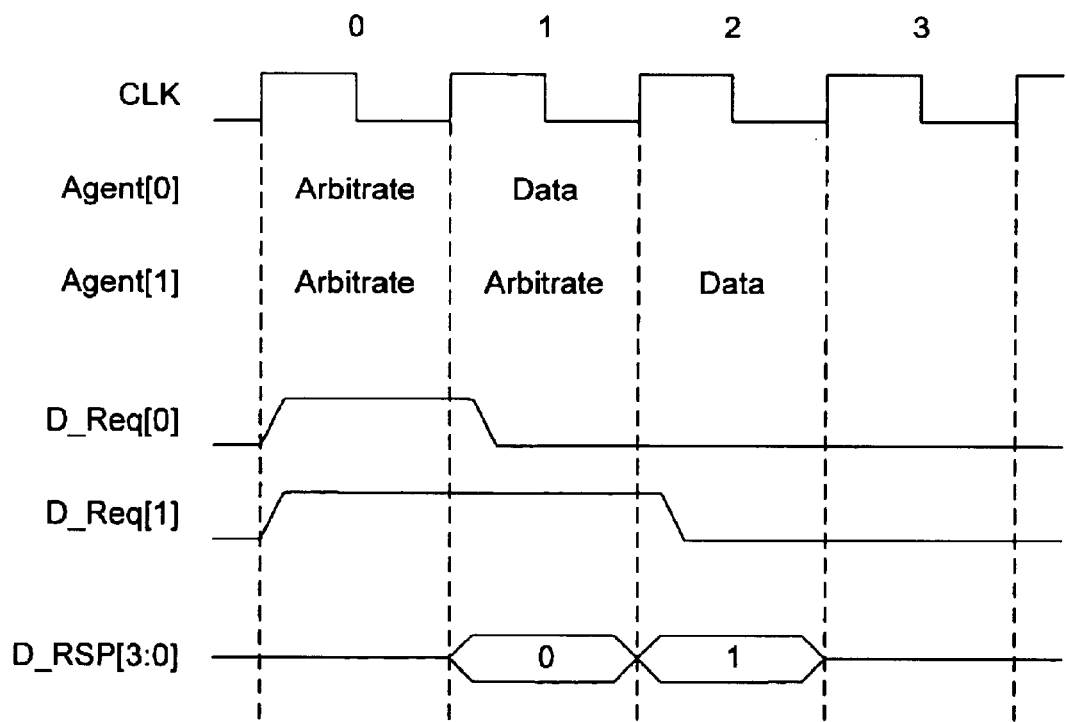
FIG. 3 is a timing diagram illustrating aspects of one embodiment of data bus arbitration.

Turning now to FIG. 3, a timing diagram is shown illustrating data arbitration according to one embodiment of system 10. Other embodiments are possible and contemplated. As shown in FIG. 3, four clock cycles of the bus 24 are illustrated (labeled 0 through 3 above the clock cycles). Clock cycles are delimited by vertical dashed lines.

Similar to FIG. 2, FIG. 3 illustrates agent[0] and agent[1]. In FIG. 3, agent[0] and agent[1] are arbitrating for the data bus. During clock cycle 0, both data request signals are asserted (D_Req[0] and D_Req[1]). Thus, the data arbiters corresponding to agent[0] and agent[1] determine whether or not the corresponding agent gets the grant. In the illustration, agent[0] is currently higher priority than agent [1], and thus the data arbiter corresponding to agent[0] indicates to agent[0] that it has won the arbitration. During clock cycle 1, agent[0] drives the data bus and thus D_RSP [3:0] in clock cycle 1 indicates agent identifier 0. Additionally, although not illustrated in FIG. 3, D ID[9:0] is driven with the transaction ID of the corresponding address transfer. Since the agent which arbitrates for the data bus may differ from the agent the arbitrates for the address bus (the agent identified by A_ID[9:6] and D_ID[9:6]), D_RSP[3:0] is included in the data transfer to identify the arbitration winner for the data bus. For example, in a read transaction, the target of the read (e.g. memory controller 16 or L2 cache 14, if a cache hit is detected, for a memory transaction) arbitrates for the data bus when the data is ready for transfer. In a write transaction, the source of the write is also the source of the data and thus arbitrates for the data bus.

During clock cycle 1, agent[1] continues to arbitrate for the data bus and agent[0] deasserts its data request signal (although agent[0] could still have arbitrated in clock cycle 1 if agent[0] had an additional data transfer to perform). Thus, in clock cycle 1, the data arbiter corresponding to agents[1] indicates to agent[1] that it has won the arbitration. During clock cycle 2, agent[1] drives the data bus and thus D_RSP[3:0] in clock cycle 2 indicates agent identifier 1.

FIG. 3 illustrates the pipelining of arbitration and data transfer implemented by one embodiment of system 10. Accordingly, a new data transfer may be initiated at a maximum rate of one per clock cycle, providing high bandwidth data transfers. Other embodiments may use more than one clock cycle per data transfer.

The clock signal for bus 24 (CLK) is illustrated in FIG. 3 as well. As described above, signals are driven on bus 24 referenced to the rising edge of the clock signal, and are sampled by receiving devices referenced to the falling edge of the clock signal. Thus, the data arbiters sample the data request signals and the agent identifier for the current data transfer on the falling edge of the clock signal, and compute whether or not the corresponding agent is granted the data bus. The winning agent drives the data bus in the subsequent clock cycle.

Figure 4:
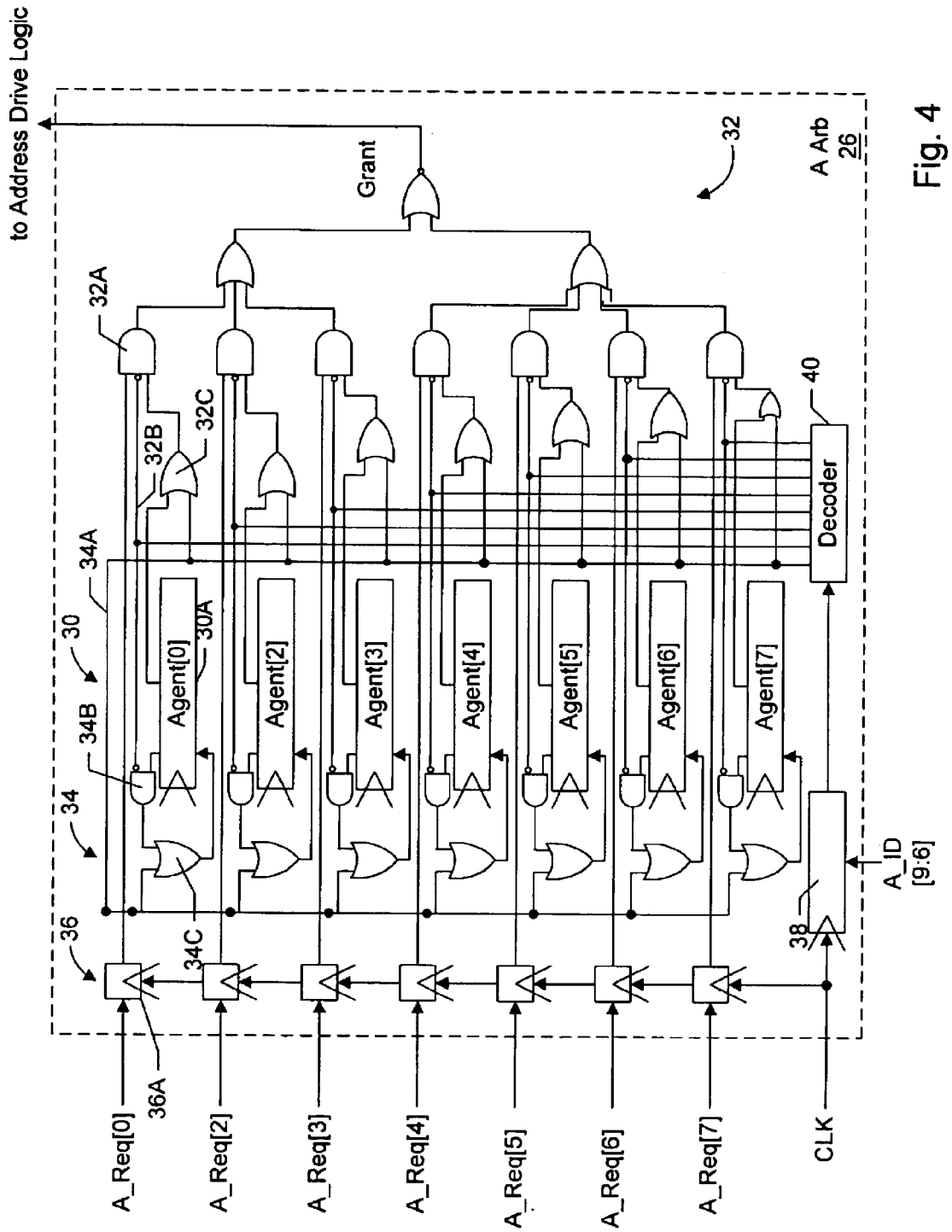
FIG. 4 is a block diagram of one embodiment of an address arbiter.

Turning next to FIG. 4, a block diagram of a first embodiment of an address arbiter 26 is shown. Other embodiments are possible and contemplated. In the embodiment of 15 FIG. 4, address arbiter 26 includes priority state registers 30, a grant circuit 32, a state update circuit 34, request registers 36, an agent identifier register 38, and a decoder 40. The illustrated embodiment is the address arbiter corresponding to agent[1]. Other embodiments corresponding to other agents may be similar, except that the request signal for agent[1] (A_Req[1]) is received and the request signal for that other agent is not received. Thus, any arbiter 26A–26E illustrated in FIG. 1 may employ circuitry similar to FIG. 4. Additionally, the data arbiter may be similar, except that the data request signals (e.g. D_[0] and D_[7:2] for agent[1]) are received instead of the address request signals and the responder ID (D_RSP[3:0]) is received as the agent identifier instead of a portion of the transaction ID (A_ID[9:6]). Request registers 36 are coupled to receive that address request signals (A_Req[0] and A_Req[7:2]) and are coupled to grant circuit 32. Agent identifier register 38 is coupled to receive an agent identifier from a current address phase of a transaction and is coupled to decoder 40. Both request registers 36 and agent identifier register 38 are clocked by the clock signal of bus 24 (CLK). More particularly, request registers 36 and agent identifier register 38 sample values at the falling edge of CLK. Priority state registers 30 are coupled to grant circuit 32 and state update circuit 34. Decoder 40 is coupled to grant circuit 32 and state update circuit 34.

Generally, priority registers 30 are configured to store a priority state indicative of which of the other agents are higher priority for address arbitration than agent[1] and which of the other agents are lower priority for address arbitration than agent[1]. For example, the state corresponding to each other agent may be a bit indicative, when set, that the other agent is higher priority than agent[1] and indicative, when clear, that the other agent is lower priority than agent[1]. Alternatively, the bit may be indicative of lower priority when set and higher priority when clear. Each of registers 30 stores the bit corresponding to one of the other agents. For example, register 30A stores the bit corresponding to agent[0].

Generally, request registers 36 and agent identifier register 38 sample values on the address request signals and A_ID[9:6] on the falling edge of the clock signal CLK. During the low phase of the clock signal CLK, grant circuit 32 determines whether or not agent[1] is granted the bus. More particularly, grant circuit 32 may indicate that agent[1] is granted the bus if no higher priority agent is requesting the bus. In the illustrated embodiment, the grant signal is generated irrespective of whether agent[1] is requesting the bus. The grant signal generated by grant circuit 32 is provided to address drive logic within agent[1 ] to allow the address drive logic to drive the address phase of a transaction on the next rising edge of the clock signal CLK. The address drive logic may qualify the grant with whether or not agent[1] was arbitrating for the address bus during the arbitration using A_Req[1], and may only actually drive the address bus if agent[1] was requesting the bus during the arbitration. In other embodiments, grant circuit 32 may receive A_Req[1] and may only assert a grant signal to the address drive logic if agent[1] is requesting the bus.

Additionally, during the low phase of the clock signal CLK, update circuit 34 determines the next state for the priority state stored in priority state registers 30, based on the agent identifier of the current transaction. More particularly, update circuit 34 may update the priority state to indicate that the winner of the preceding arbitration (indicated by the agent identifier captured by agent identifier register 38) is lower priority than agent[1] or, if agent[1] is the winner of the arbitration, to indicate that each other agent is higher priority than agent[1]. A more detailed discussion of the grant and update circuits with respect to the priority state of agent[0] according to one embodiment is next described. The circuitry may be similar for the other agents (2–7). Furthermore, the logic gates illustrated are but one embodiment of a grant or update circuit. Other embodiments may use any other set of gates.

Request register 30A captures the address request signal for agent[0] A_Req[0]) and provides the address request signal to an AND gate 32A. Additionally, decoder 40 decodes the agent identifier received by agent identifier register 38. Decoder 40 produces a signal corresponding to each agent, asserting the signal if the agent identifier identifies that agent. Thus, for example, signal 32B may be asserted if the agent identifier indicates agent[0]. Signal 34A may be asserted if the agent identifier identifies agent[1]). Other signals correspond to the remaining agents (2–7), as illustrated in FIG. 4. Signal 32B is provided to AND gate 32A as well. Finally, the priority state bit corresponding to agent[0] is provided by priority state register 30A to an OR gate 34C, which also receives signal 34A. The output of OR gate 34C is provided to AND gate 32A.

Agent[0] prevents agent[1] from winning the arbitration if: (i) agent[0] is requesting the bus, (ii) agent[0] is higher priority than agent[1] (including if agent[1] won the prior arbitration), and (iii) agent [0] is not the agent which won the preceding arbitration (as indicated by the assertion of signal 32B). On the other hand, agent[0] does not prevent agent[1] from winning the arbitration if: (i) agent[0]) is not requesting the bus, or (ii) agent[0] is lower priority than agent[1], or (iii) agent[0] won the preceding arbitration. Thus, OR gate 32C ORs the signal 34A (indicating that agent[1] won the preceding arbitration and therefore agent[0] is higher priority than agent[1] in the current arbitration) with the current priority state for agent[0]) from priority register 30A. AND gate 32A ANDs the inversion of signal 32C with the request signal for agent[0] and the priority state of agent[0] as calculated by OR gate 32C. If AND gate 32A asserts its output signal, then agent[1] does not win the current arbitration (agent[0] may win or some other higher priority agent may win). Accordingly, the output signal of AND gate 32A is NORed with the output signals of other AND gates corresponding to the other agents to produce the grant signal.

Figure 5:
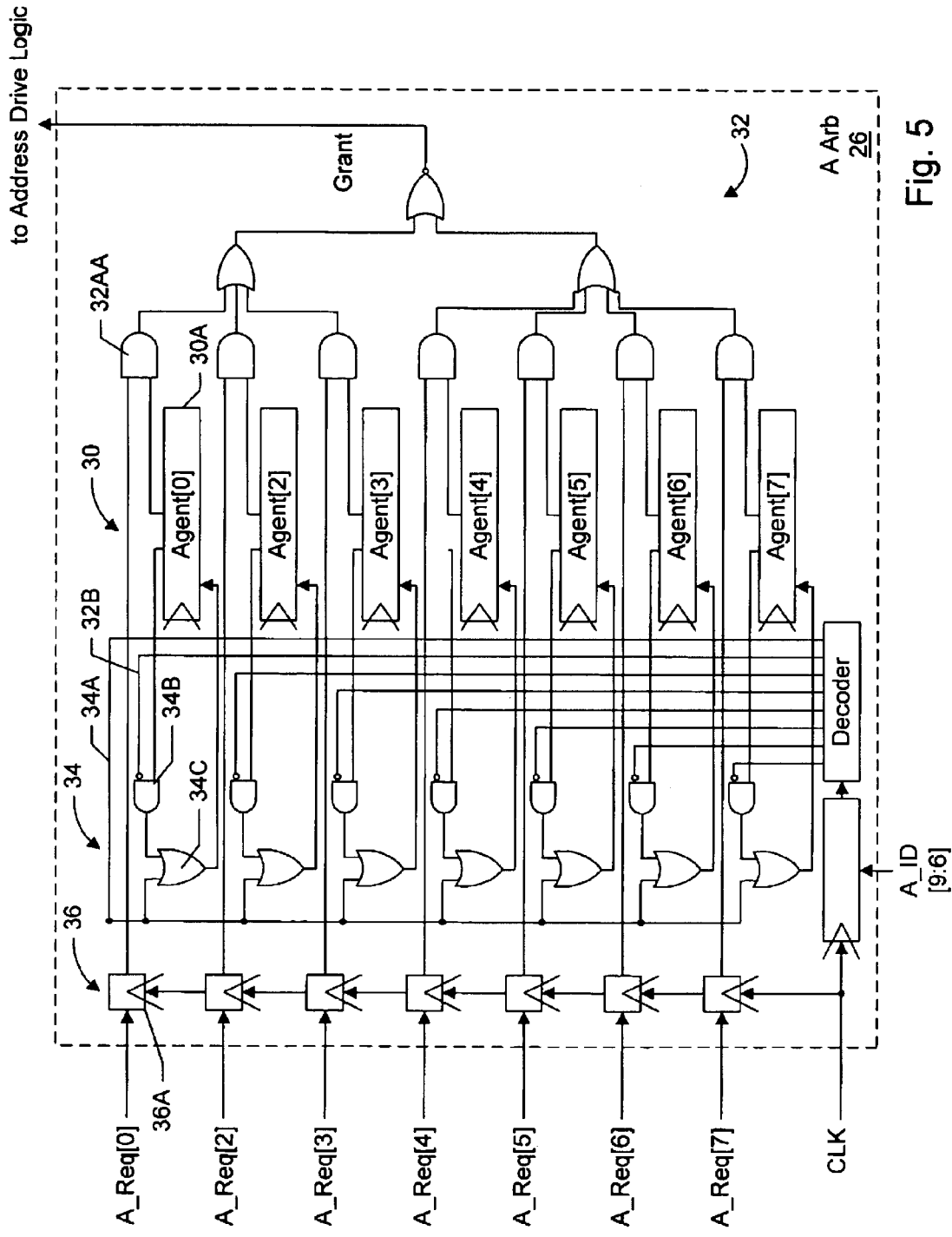
FIG. 5 is a block diagram of a second embodiment of an address arbiter.

In the illustrated embodiment, the winner of the preceding arbitration is provided (via the agent identifier) at the same time that the current arbitration is being performed. Thus, to ensure that the preceding winner (which may still be marked as higher priority in priority state registers 30 during the current arbitration, since the update state is being calculated in parallel) does not win the arbitration again, the signal corresponding to each agent from decoder 40 is included in the grant calculation by grant circuit 32 and OR gates similar to OR gate 32C are provided to update the priority state for the current arbitration. However, alternative embodiments may choose not to include the preceding winner in the grant calculation. Such an embodiment is illustrated in FIG. 5. In FIG. 5, the winner of the preceding calculation is still used by state update circuit 34 to update the priority state, but is not factored into the grant determination. Accordingly, the fairness of the arbitration for the embodiment of FIG. 5 is slightly lower, since the highest priority agent could win the arbitration two cycles in a row. However, the scheme is still relatively fair, and the grant circuit 32 illustrated in FIG. 5 may operate more rapidly since fewer inputs are used to generate the grant. For example, AND gate 32AA in FIG. 5 may be similar to AND gate 32A, but includes only the priority bit from register 30A and the request signal from request register 36A as inputs.

In parallel with grant circuit 32 determining whether or not agent[ 1] wins the current arbitration, update circuit 34 updates the priority state based on the preceding arbitration winner, as indicated by the agent identifier captured by agent identifier register 38. More particularly, for the update of the priority bit corresponding to agent[0], an AND gate 34B and an OR gate 34C are used to generate the next state. AND gate 34B receives the current priority bit for agent[0] from priority register 30A, and signal 32B from decoder 40. OR gate 34C receives the output of AND gate 34B and signal 34A (corresponding to a decode of the agent identifier corresponding to agent[1]).

AND gate 34B provides the current state of the priority bit as an input to OR gate 34B unless signal 32B is asserted (indicating that agent[0] won the preceding arbitration), in which case AND gate 34A provides a binary zero input to OR gate 34B. Additionally, signal 34A is asserted if agent[1] won the preceding arbitration.

Accordingly, the priority bit corresponding to agent[0] is set (indicating higher priority than agent[1]) if agent[1] won the preceding arbitration. The priority bit is cleared if agent[0] won the preceding arbitration. Otherwise, the state of the priority bit is fare: not changed. Signal 34A further causes each other priority bit in priority registers 30 to be set, causing agent[1]) to be the lowest priority arbiter when agent[1] wins the arbitration. Other priority bits may also be cleared when the corresponding agent wins the arbitration, using gates similar to gates 34B–34C.

Not shown in FIG. 4 is reset circuitry to establish a reset state for the priority state. Each of the address arbiters resets to a priority state which is consistent with the priority state in the other address arbiters, to ensure that only one agent wins each arbitration. In one embodiment, the priority state for a given address arbiter is reset to indicate that each lower-numbered agent is higher priority than the agent to which the given address arbiter corresponds and to indicate that each higher-numbered agent is lower priority than the agent to which the given address arbiter corresponds. For example, the address arbiter in FIG. 4 is for agent[1], and thus the reset priority state for the address arbiter shown in FIG. 4 indicates that agent[0] is higher priority than agent[1] and the remaining agents are lower priority than agent[1]. In another embodiment, the priority state for a given address arbiter is reset to indicate that each lower-numbered agent is lower priority than the agent to which the given address arbiter corresponds and to indicate that each higher-numbered agent is higher priority than the agent to which the given address arbiter corresponds.

It is noted that, in the illustrated embodiment, the winner of the arbitration takes control of the bus in the next consecutive clock cycle. In other embodiments, one or more clock cycles of delay may occur between the arbitration and the corresponding address transfer, if desired.

Figure 9:
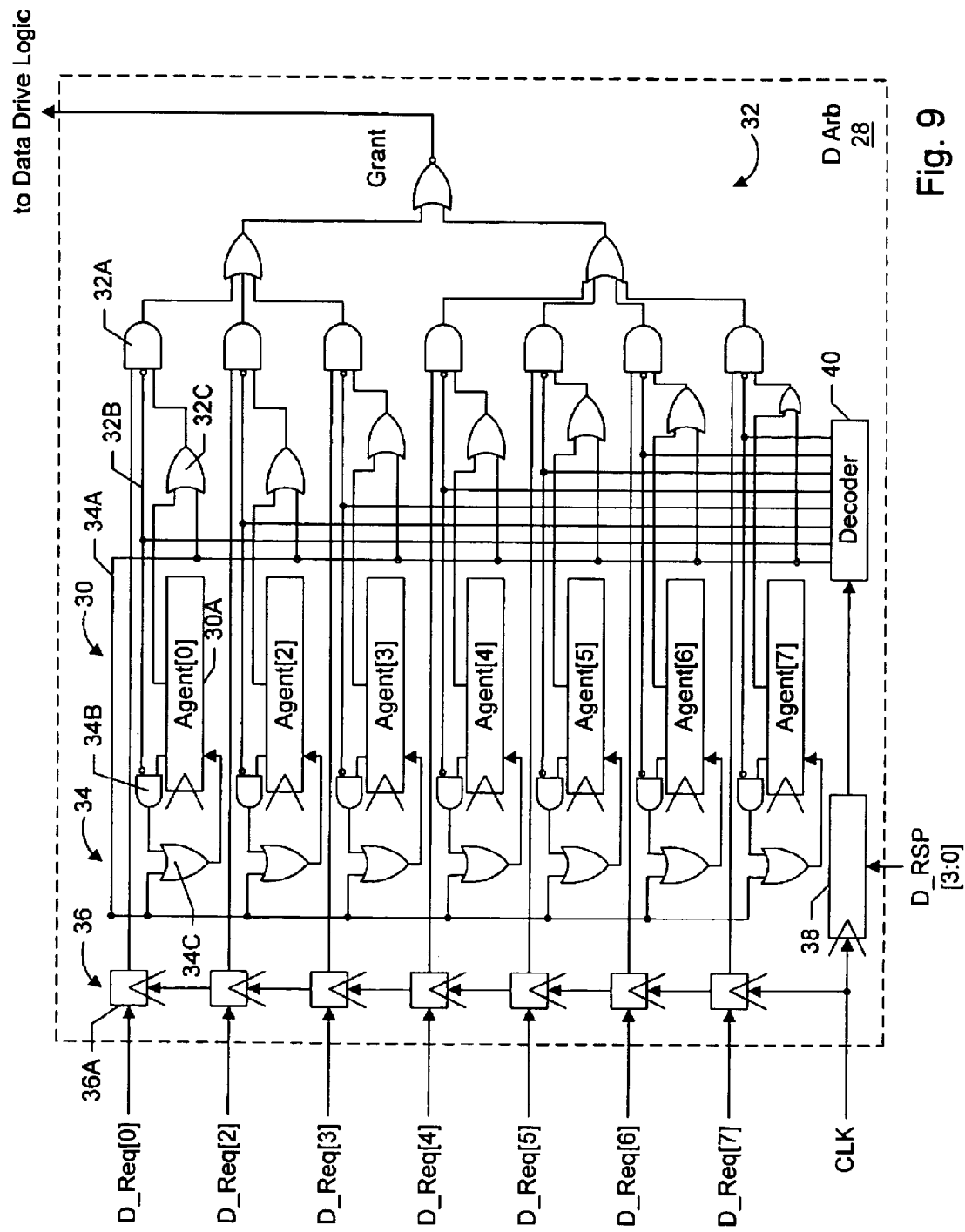
FIG. 9 is a block diagram of one embodiment of a data arbiter.

It is further noted that, while specific logic gates are illustrated in FIGS. 4, 5, and 9 for ease of understanding, the illustrated logic is merely exemplary. Any set of logic gates may be used. Specifically, any Boolean equivalents of the illustrated logic may be used. Still further, similar logic circuits using different gates may be used depending upon whether the request signals are active high or active low and depending on whether the grant signal is active high or active low. For example, if the request signals were active low (i.e. asserted when low), AND gates 32A and 32AA may have inverting inputs for the request signal. Any circuit which calculates the grant based on the priority state and the request signals may be used, as may any circuit which updates the priority state based on the agent identifier.

As used herein, the term "register" is used to refer to any clocked storage device. For example, a register may be a flip-flop (or "flop"), a latch, a series of latches, a clocked random access memory (RAM) cell, or any other desirable storage. Additionally, although priority registers 30 and request registers 36 are illustrated as separate registers per agent in FIGS. 4, 5 and 9, priority registers 30 may be implemented as a single register having multiple bits corresponding to the various agents and request registers 36 may be implemented as a single register having multiple bits corresponding to the various agents as well.

Figure 6:
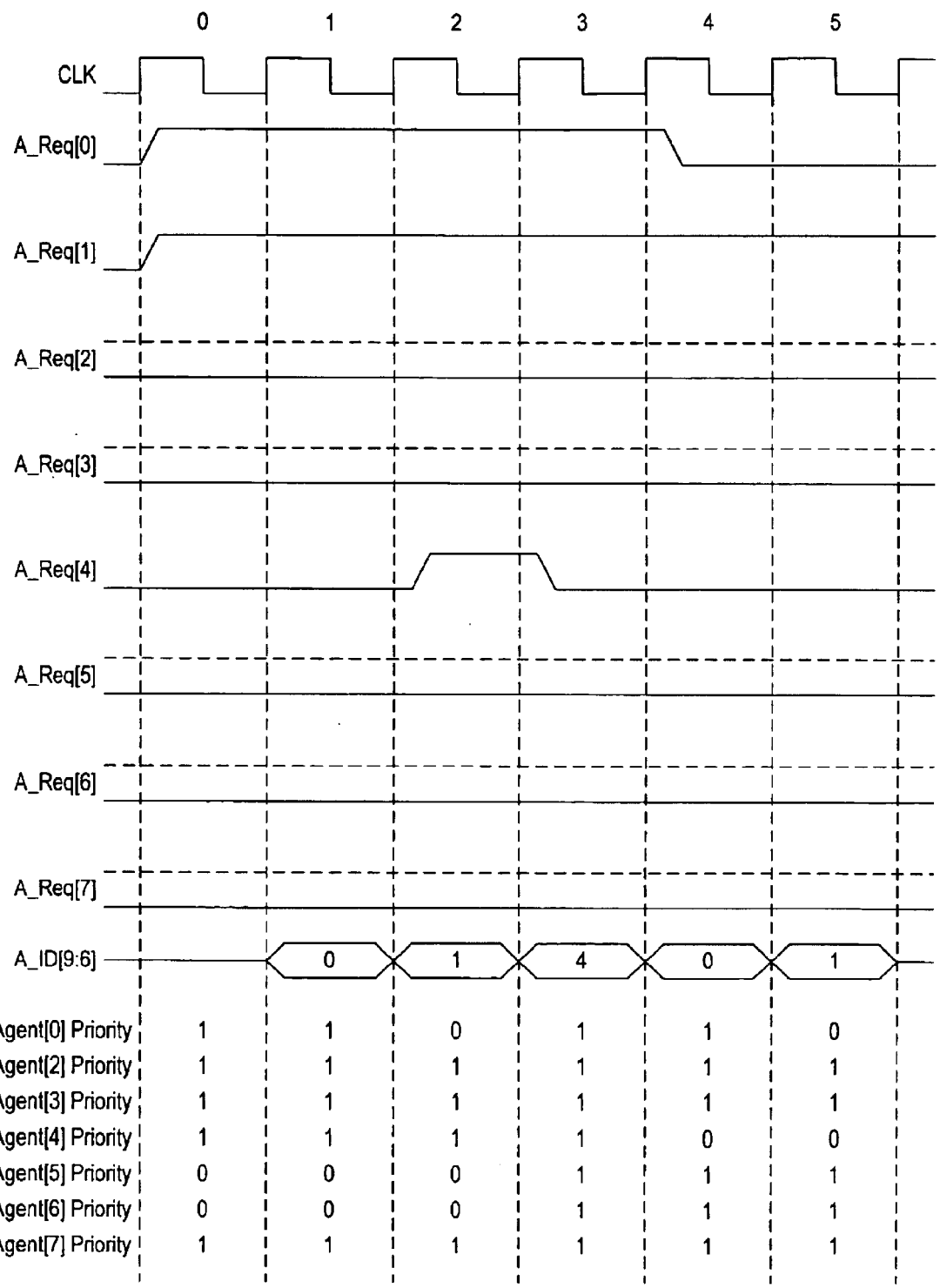
FIG. 6 is a timing diagram illustrating an example of several address arbitrations.

Turning next to FIG. 6, a timing diagram is shown illustrating several exemplary address arbitrations according to the embodiment of address arbiter 26 shown in FIG. 4. Clock cycles are delimited by vertical dashed lines, and labeled with a clock cycle number (0–5) centered above each clock cycle. Additionally, for signals which do not change state in FIG. 6, a horizontal dashed line is used to illustrate which state that signal is in. For example, A_Req[2] does not change state in FIG. 6, and the dashed line above A_Req[2] is indicative that A_Req[2] is deasserted.

FIG. 6 illustrates each of the request signals A_Req[7:0], the agent identifier transmitted during the address phase, and the priority state of address arbiter 26 as illustrated in FIG. 4. During clock cycle 0, the priority state indicates that agents 0, 2, 3, 4 and 7 are higher priority than agent[1]. Additionally, during clock cycle 0, agents 0 and 1 are arbitrating for the bus as illustrated by the assertion of A_Req[0] and A_Req[1], respectively. The request signals are sampled on the falling edge of the clock signal CLK during clock cycle 0, and address arbiter 26 determines the grant for agent[1]. Since agent[0] is arbitrating and is higher priority than agent[1], agent[1] does not win the arbitration in clock cycle 0.

In clock cycle 1, agent[0] drives an address phase of a transaction (thus indicating to address arbiter 26 that agent [0] won the arbitration of clock cycle 0). Additionally, both agent[1] and agent[0] arbitrate during clock cycle 1. Even though the priority state still indicates that agent[0] is higher priority than agent[1], the agent identifier indicating that agent[0] won the preceding arbitration causes agent[0] not to inhibit the grant to agent[1]. Thus, address arbiter 26 detects that agent[1] wins the arbitration in clock cycle 1, and signals a grant to agent[1]. Agent[1] drives an address phase of a transaction in clock cycle 2 (thus providing agent identifier 1 in clock cycle 2). Additionally, during clock cycle 1, address arbiter 26 calculates a new priority state that indicates agent[0] is lower priority than agent[1] (responsive to the agent identifier). Thus, the state during clock cycle 2 includes a zero for the priority of agent[0].

During clock cycle 2, agent[4] arbitrates for the bus. Since agent[4] is higher priority than agent[1], agent[4] wins the arbitration for clock cycle 2 and drives an address phase of a transaction in clock cycle 3. Additionally, during clock cycle 2, address arbiter 26 calculates a new priority state indicating that agent[1] is lowest priority, responsive to address identifier 1 from the address phase. Thus, each other agent is indicated as higher priority than agent[1] in clock cycle 3.

Similarly, during clock cycle 3, agent[0] wins the arbitration again and drives an address phase of a transaction in clock cycle 4, and agent[1] wins the arbitration for clock cycle 4 and drives an address phase of a transaction in clock cycle 5.

Figure 7:
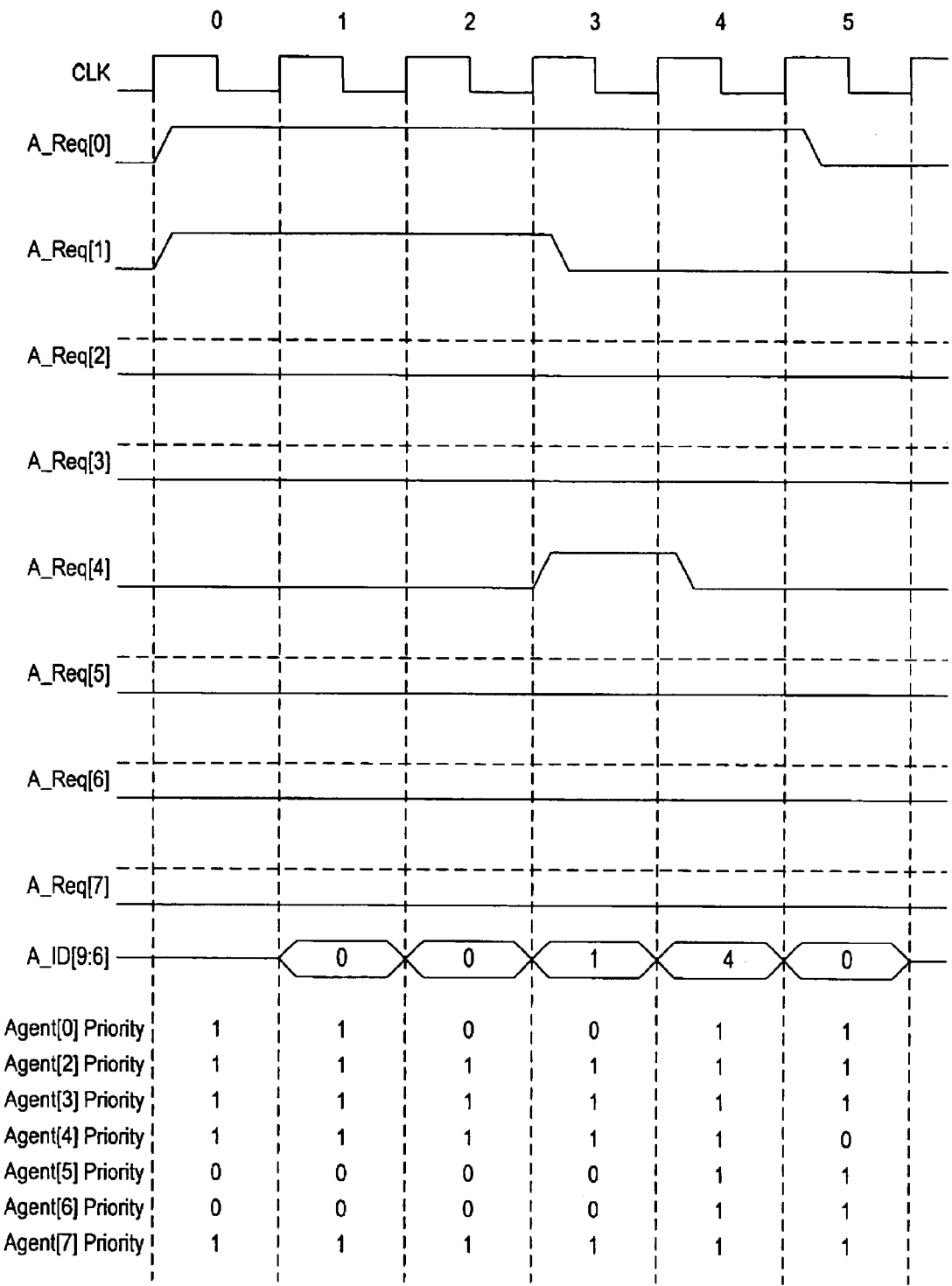
FIG. 7 is a timing diagram illustrating a second example of several address arbitrations.

Turning next to FIG. 7, a timing diagram is shown illustrating several exemplary address arbitrations according to the embodiment of address arbiter 26 shown in FIG. 5. Similar to FIG. 6, clock cycles are delimited by vertical dashed lines, and labeled with a clock cycle number (0–5) centered above each clock cycle. Additionally, for signals which do not change state in FIG. 7, a horizontal dashed line is used to illustrate which state that signal is in. For example, A_Req[2] does not change state in FIG. 7, and the dashed line above A_Req[2] is indicative that A_Req[2] is deasserted.

During clock cycle 0, the priority state indicates that agents 0, 2, 3, 4 and 7 are higher priority than agent[1]. Additionally, during clock cycle 0, agents 0 and 1 are arbitrating for the bus as illustrated by the assertion of A_Req[0] and A_Req[1], respectively. The request signals are sampled on the falling edge of the clock signal CLK during clock cycle 0, and address arbiter 26 determines the grant for agent[1]. Since agent[0] is arbitrating and is higher priority than agent[1], agent[1] does not win the arbitration in clock cycle 0.

In clock cycle 1, agent[0] drives an address phase of a transaction (thus indicating to address arbiter 26 that agent [0] won the arbitration of clock cycle 0). Additionally, agents 0 and 1 arbitrate during clock cycle 1. Even though agent[0] won the preceding arbitration, the priority state still indicates that agent[1] is higher priority than agent[1]. Since the agent identifier of the current address phase is not included in the grant determination in this embodiment, agent[0] wins the arbitration again during clock cycle 1. Thus, agent[0] drives an address phase of a transaction in clock cycle 2 (thereby providing agent identifier 0 in clock cycle 2). Additionally, during clock cycle 1, address arbiter 26 calculates a new priority state based on agent identifier 0 presented in clock cycle 1. The new priority state indicates that agent[0] is lower priority than agent[1]. Thus, the state during clock cycle 2 includes a zero for the priority of agent[0].

Agents 0 and 1 arbitrate in clock cycle 2. However, since the priority state now indicates that agent[0] is lower priority than agent[1], the arbitration by agent[0] does not prevent agent[1] from winning the arbitration. Address arbiter 26 determines that agent[1] wins the arbitration in clock cycle 2. Accordingly, agent[1] drives an address phase of a transaction in clock cycle 3.

During clock cycle 3, agents 0 and 4 arbitrate for the address bus. Agent[4] wins the arbitration. Thus, agent[4] drives an address phase of a transaction in clock cycle 4. Additionally, address arbiter 26 calculates a new priority state in clock cycle 3 based on the agent identifier 1 presented in clock cycle 3. The new priority state, illustrated in clock cycle 4, indicates that each other agent is higher priority than agent[1].

During clock cycle 4, arbiter 26 calculates a new priority state based on the agent identifier 4 presented during clock cycle 4, resulting in the priority state shown in clock cycle 5. Finally, agent[0] wins the arbitration in clock cycle 4 and drives an address phase of a transaction in clock cycle 5.

Figure 8:
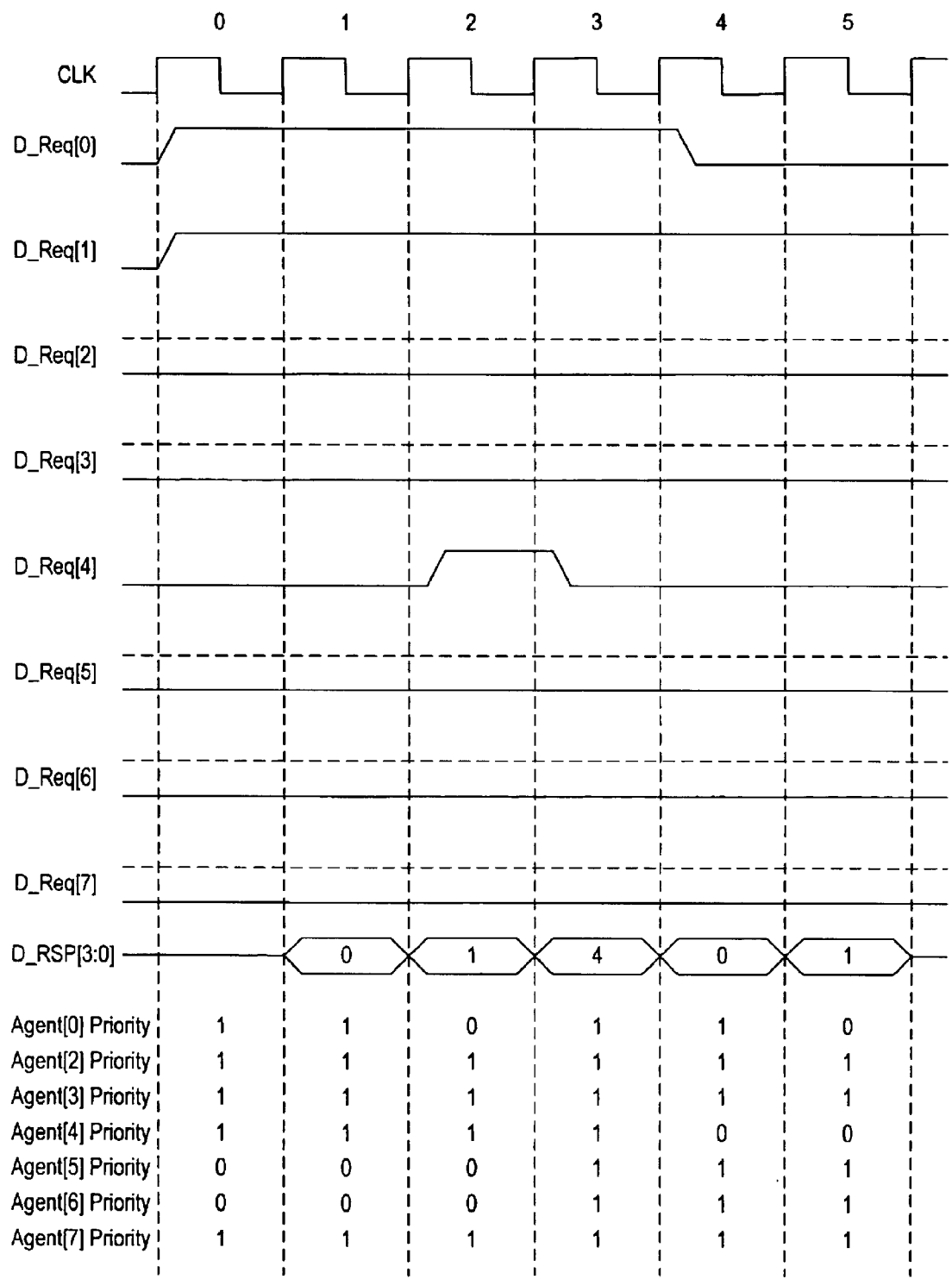
FIG. 8 is a timing diagram illustrating an example of several data arbitrations.

As mentioned above, data arbitration may operate in a manner similar to address arbitration except that the agent identifier is provided separate from the transaction ID. Thus, FIG. 8 is a timing diagram similar to FIG. 6, except that the data request signals (D_Req[7:0]) and the data agent identifier (D_RSP[3:0]) are illustrated instead of the address request signals and address agent identifier (A_ID[9:6]). However, given the same agent requests and priority state, the same arbitration results are observed. It is noted that the priority state illustrated in FIG. 8 is the data priority state, which is separate from and independent of the address priority state for the same agent, in the present embodiment. At any given clock cycle, the address priority state and the data priority state for the same agent may differ, since the address priority state is updated based on address agent identifiers indicating address arbitration results and the data priority state is updated based on the data agent identifiers indicating data arbitration results. FIG. 9 is an illustration of an embodiment of a data arbiter 28 which may be used for agent 1. FIG. 9 is similar to FIG. 4, except that D_Req signals and D_RSP[3:0] are received by the circuit instead of A_Req signals and A_ID[9:6]. An embodiment of data arbiter 28 similar to FIG. 5 (with the same changes as between FIG. 4 and FIG. 9) is contemplated as well.

It is noted that, while the request signals are illustrated above as being asserted when at a logical high level, other embodiments may define asserted to be a logical low level. Further-more, in one embodiment, the signals are differential and thus the illustrated signals represent the difference between the differential signals.

Figure 10:
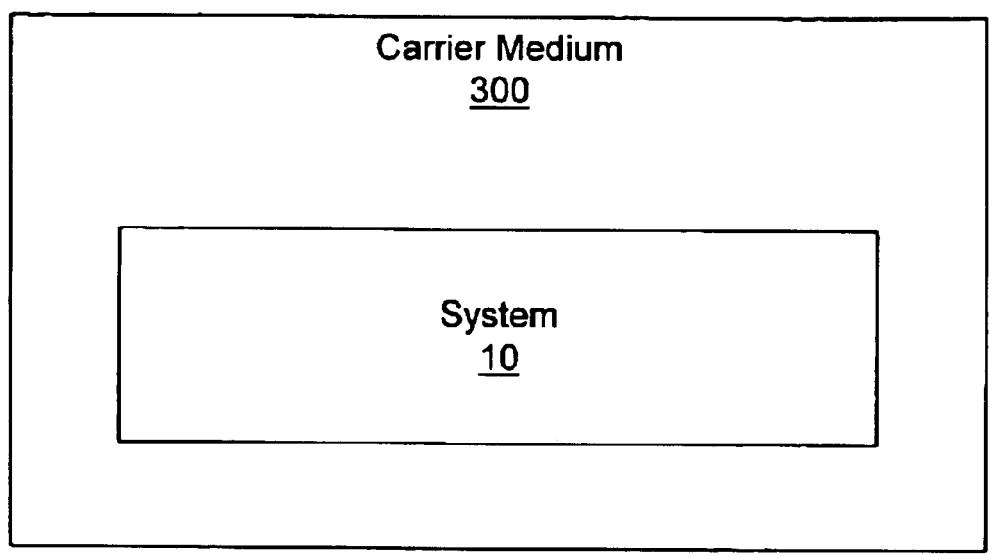
FIG. 10 is one embodiment of a carrier medium.

Turning next to FIG. 10, a block diagram of a carrier medium 300 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 300 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 300 may be the netlist (with or without the synthesis library) or the data set, as desired.

While carrier medium 300 carries a representation of system 10, other embodiments may carry a representation of any portion of system 10, as desired, including any combination of one or more agents, arbiters, memory controllers, buses, memory, etc.

Numerous variations and modifications will become apparent to those skilled in the art once the above disclosure is fully appreciated. It is intended that the following claims be interpreted to embrace all such variations and modifications.

What is claimed:

1. A first agent configured for coupling to a bus in which said first agent is one of a plurality of agents that are capable of being coupled to said bus, said plurality of agents having corresponding arbiters coupled to receive request signals and operate as distributed arbiters among the plurality of agents, said request signals corresponding to whether or not the arbiter of a respective agent is arbitrating for said bus, wherein an arbiter of said first agent is to maintain order of its priority in relation to other agents arbitrating for said bus and to determine if said first agent wins an arbitration for said bus responsive to said request signals without determining which other agent wins arbitration, and wherein if said first agent wins arbitration for said bus, said first agent to send an agent identifier with a transaction accessing said bus to notify other agents that said first agent has won arbitration, but if one of the other agents wins arbitration, said first agent to update its order of priority with respect to the other agent winning arbitration when that agent's agent identifier is received with a transaction initiated by the other agent in accessing said bus.

2. The first agent as recited in claim 1, wherein said arbiter of said first agent comprises one or more registers configured to store a state indicative of: (i) which of said plurality of agents are higher priority than said first agent for said arbitration; and (ii) which of said plurality of agents are lower priority than said first agent for said arbitration.

3. The first agent as recited in claim 2 wherein said arbiter of said first agent further includes a circuit configured to generate a grant signal to said first agent responsive to said plurality of request signals and said state, said grant signal indicative of whether or not said first agent wins said arbitration.

4. The first agent as recited in claim 3 wherein said circuit is further responsive to the other agent's agent identifier when sent in the transaction accessing said bus by the other agent winning arbitration.

5. The first agent as recited in claim 2 wherein said arbiter of said first agent further comprises a circuit configured to update said state responsive to the other agent's agent identifier when sent in the transaction accessing the bus by the other agent winning arbitration, wherein said circuit is configured to update said state to indicate a lower priority for said winning agent.

6. The first agent as recited in claim 4 wherein said circuit is further configured to update said state to indicate that other agents are higher in priority than said first agent responsive to said first agent winning said arbitration.

7. The first agent as recited in claim 1 wherein said bus is a split transaction bus, and wherein said arbiter for said first agent is configured to arbitrate for an address portion of said bus.

8. The first agent as recited in claim 1 wherein said bus is a split transaction bus, and wherein said arbiter for said first agent is configured to arbitrate for a data portion of said bus.

9. A system comprising:
a bus, in which said bus to transfer a plurality of request signals and an agent identifier transmitted with a transaction on said bus; and
a plurality of agents coupled to said bus in which each agent has a distributed arbiter included therewith, each agent to generate a respective request signal for providing an indication of whether or not said agent is arbitrating for said bus, wherein the distributed arbiter of each respective agent to maintain order of its priority in relation to other agents arbitrating for said bus to determine if it wins an arbitration for said bus, but without determining which other agent wins arbitration, and wherein if a particular agent wins arbitration for said bus, the particular agent to send its respective agent identifier with a transaction accessing said bus to notify other agents that the particular agent has won arbitration and other agents not winning arbitration to receive the agent identifier of the particular agent winning arbitration to update respective order of priority.

10. The system as recited in claim 9 wherein each said arbiter comprises one or more registers configured to store a state indicative of: (i) which of said plurality of agents are higher priority than said respective agent for said arbitration; and (ii) which of said plurality of agents are lower priority than said respective agent for said arbitration.

11. The system as recited in claim 10 wherein each said arbiter further includes a circuit configured to generate a grant signal to said respective agent responsive to said plurality of request signals and said state, said grant signal indicative of whether or not said respective agent wins said arbitration.

12. The system as recited in claim 11 wherein said circuit for each said arbiter is further responsive to a winning agent's agent identifier to identify which agent won said arbitration.

13. The system as recited in claim 10 wherein each said arbiter further comprises a circuit configured to update said state responsive to receiving an agent identifier from an agent winning said arbitration.

14. The system as recited in claim 10 wherein each said arbiter further comprises a circuit configured to update its respective state to indicate that other agents are higher in priority than said respective agent responsive to said respective agent winning said arbitration.

15. The system as recited in claim 9 wherein said bus is a split transaction bus, and wherein each said arbiter is configured to arbitrate for an address portion of said bus, and wherein said agent identifier is included as a portion of an address transaction.

16. The system as recited in claim 9 wherein said bus is a split transaction bus, and wherein each said arbiter is configured to arbitrate for a data portion of said bus, and wherein said agent identifier is included as a portion of a data transaction.

17. A method comprising:
maintaining in a distributed arbiter for a first agent, a state indicative of: (i) which of a plurality of agents coupled to a bus are higher priority than said first agent for an arbitration, and (ii) which of said plurality of agents are lower priority than said first agent for said arbitration;
arbitrating for the bus by sending a request signal;
receiving request signals of other agents arbitrating for the bus;
determining the state of the first agent in relation to priorities of other agents arbitrating for the bus to determine if the first agent wins said arbitration, but without determining which other agent wins arbitration;
sending an agent identifier with a transaction from said first agent, if said first agent wins said arbitration to notify other agents that said first agent has won arbitration;
receiving an agent identifier of an agent winning arbitration with a transaction initiated by the winning agent in accessing said bus, if said first agent does not win arbitration; and
using the received agent identifier from the winning agent to update said state of priority.

18. The method as recited in claim 17 wherein said determining includes being responsive to agent identifiers included with the request signals.

19. The method as recited in claim 17 further comprising updating said state for said first agent to indicate that each of said plurality of agents requesting arbitration is higher priority than said first agent if said first agent wins said arbitration.

20. A distributed arbiter comprising:
one or more registers of the distributed arbiter of a first agent configured to store a state indicative of: (i) which of a plurality of agents coupled to a bus are higher priority than said first agent for an arbitration, and (ii) which of said plurality of agents are lower priority than said first agent for said arbitration; said first agent and plurality of agents having respective distributed arbiters to determine priority of arbitration requests for said bus and said arbiter for said first agent to compare arbitration requests from other agents to said state stored in said one or more registers to determine if said first agent wins said arbitration, but without determining which other agent wins arbitration, if said first agent does not win arbitration; and
a first circuit coupled to receive an agent identifier indicative of a second agent winning arbitration of said bus if said first agent does not win arbitration, said agent identifier from said second agent transmitted on said bus as part of a transaction from a distributed arbiter of said second agent to notify other agents that said second agent has won arbitration, wherein said first circuit is configured to update said state responsive to said agent identifier from said second agent.

21. The arbiter as recited in claim 20 wherein said first circuit in said first agent is configured to update said state to indicate that said second agent is lower priority than said first agent if said second agent wins arbitration.

22. The arbiter as recited in claim 20 further comprising a second circuit coupled to said one or more registers and coupled to receive said arbitration requests, wherein said second circuit is configured to determine if said first agent wins said arbitration responsive to said state and said arbitration requests.

23. The arbiter as recited in claim 22 wherein said first circuit is configured to update said state to indicate that other agents are higher priority than said first agent responsive to said first agent winning said arbitration.

24. The arbiter as recited in claim 22 wherein said second circuit is configured to determine if said first agent wins said arbitration using the agent identifiers to identify agents that generate arbitration requests.

25. The arbiter as recited in claim 20 wherein said bus is a split transaction bus, and wherein said arbiter is configured to arbitrate to place an address on said bus.

26. The arbiter as recited in claim 20 wherein said bus is a split transaction bus, and wherein said arbiter is configured to arbitrate to place data on said bus.

27. The arbiter as recited in claim 25 wherein said bus is a split transaction bus, and wherein said arbiter is configured to arbitrate to place data on said bus.

28. A carrier medium comprising a database which is operated upon by a program executable on a computer system, the program operating on the database to perform a portion of a process to fabricate an integrated circuit including circuitry described by the database, the circuitry described in the database including a first agent configured for coupling to a bus in which said first agent is one of a plurality of agents that are capable of being coupled to said bus, said plurality of agents having corresponding arbiters coupled to receive request signals and operate as distributed arbiters among the plurality of agents, said request signals corresponding to whether or not the arbiter of a respective agent is arbitrating for said bus, wherein an arbiter of said first agent is to maintain order of its priority in relation to other agents arbitrating for said bus and to determine if said first agent wins an arbitration for said bus responsive to said request signals without determining which other agent wins arbitration, and wherein if said first agent wins arbitration for said bus, said first agent to send an agent identifier with a transaction accessing said bus to notify other agents that said first agent has won arbitration, but if one of the other agents wins arbitration, said first agent to update its order of priority in respect to the other agent winning arbitration when that agent's agent identifier is received with a transaction initiated by the other agent in accessing said bus.

29. The carrier medium as recited in claim 28, wherein said arbiter of said first agent comprises one or more registers configured to store a state indicative of: (i) which of said plurality of agents are higher-priority than said first agent for said arbitration; and (ii) which of said plurality of agents are lower priority than said first agent for said arbitration.

30. The carrier medium as recited in claim 29 wherein said arbiter of said first agent further includes a circuit configured to generate a grant signal to said first agent responsive to said plurality of request signals and said state, said grant signal indicative of whether or not said first agent wins said arbitration.

31. The carrier medium as recited in claim 30 wherein said circuit is further responsive to the other agent's agent identifier when sent in the transaction accessing said bus by the other agent winning arbitration.

32. The carrier medium as recited in claim 29 wherein said arbiter of said first agent further comprises a circuit configured to update said state responsive to the other agent's agent identifier when sent in the transaction accessing said bus by the other agent winning arbitration.

33. The carrier medium as recited in claim 32 wherein said circuit is further configured to update said state to indicate that other agents are higher in priority than said first agent responsive to said first agent winning said arbitration.

34. The carrier medium as recited in claim 28 wherein said bus is a split transaction bus, and wherein said arbiter for said first agent is configured to arbitrate for an address portion of said bus.

35. The carrier medium as recited in claim 28 wherein said bus is a split transaction bus, and wherein said arbiter for said first agent is configured to arbitrate for a data portion of said bus.

36. A carrier medium comprising a database which is operated upon by a program executable on a computer system, the program operating on the database to perform a portion of a process to fabricate an integrated circuit including circuitry described by the database, the circuitry described in the database including a distributed arbiter comprising:

one or more registers of the distributed arbiter of a first agent configured to store a state indicative of: (i) which of a plurality of agents coupled to a bus are higher priority than said first agent for an arbitration, and (ii) which of said plurality of agents are lower priority than said first agent for said arbitration; said first agent and plurality of agents having respective distributed arbiters to determine priority of arbitration requests for said bus and said arbiter for said first agent to compare arbitration requests from other agents to said state stored in said one or more registers to determine if said first agent wins said arbitration, but without determining which other agent wins arbitration, if said first agent does not win arbitration; and a first circuit coupled to receive an agent identifier indicative of a second agent winning arbitration of said bus if said first agent does not win arbitration, said agent identifier from said second agent transmitted on said bus as part of a transaction from a distributed arbiter of said second agent to notify other agents that said second agent has won arbitration, wherein said first circuit is configured to update said state responsive to said agent identifier from said second agent.

37. The carrier medium as recited in claim 36 wherein said first circuit in said first agent is configured to update said state to indicate that said second agent is lower priority than said first agent if said second agent wins arbitration.

38. The carrier medium as recited in claim 36 wherein said arbiter further comprises a second circuit coupled to said one or more registers and coupled to receive said arbitration requests, wherein said second circuit is configured to determine if said first agent wins said arbitration responsive to said state and said arbitration requests.

39. The carrier medium as recited in claim 38 wherein said first circuit is configured to update said state to indicate that other agents are higher priority than said first agent responsive to said first agent winning said arbitration.

40. The carrier medium as recited in claim 38 wherein said second circuit is configured to determine if said first agent wins said arbitration using the agent identifiers to identify agents that generate arbitration requests.

41. The carrier medium as recited in claim 38 wherein said bus is a split transaction bus, and wherein said arbiter is configured to arbitrate to place an address on said bus.

42. The carrier medium as recited in claim 36 wherein said bus is a split transaction bus, and wherein said arbiter is configured to arbitrate to place data on said bus.

* * * * *